(12) United States Patent
Pignataro

(10) Patent No.: US 6,607,759 B2
(45) Date of Patent: Aug. 19, 2003

(54) PROCESS FOR PREPARING A MILK JAM WITHOUT ADDED SUGAR

(75) Inventor: Eliana Beatriz Ribeiro Pignataro, Montevideo (UY)

(73) Assignee: Gabriel Julio Flangini Morales, Montevideo (UY)

( * ) Notice: Subject to any disclaimer, the term of this patent is extended or adjusted under 35 U.S.C. 154(b) by 0 days.

(21) Appl. No.: 09/969,335

(22) Filed: Oct. 1, 2001

(65) Prior Publication Data

US 2002/0058095 A1 May 16, 2002

(51) Int. Cl.[7] .................................................. A23C 9/12
(52) U.S. Cl. ........................ 426/34; 426/42; 426/548; 426/575; 426/580; 426/587
(58) Field of Search ........................... 426/34, 42, 580, 426/587, 573, 575, 548

(56) References Cited

PUBLICATIONS

Occhi et al., AN 1975(06):G0332 FSTA, abstracting IV International Congress of Food Science and Technology, 1974, 1d, 37–39.*

Castelao et al., AN 1978(09):P1348 FSTA, abstracting Revista del I.T.A. (Instituto de Tecnologia de Alimentos), 1977, 2(1), 173–176.*

* cited by examiner

*Primary Examiner*—Leslie Wong
(74) *Attorney, Agent, or Firm*—Abelman, Frayne & Schwab

(57) ABSTRACT

A process for the preparation of a dietetic milk jam having no sucrose and having the same organoleptic properties as traditional milk jam is formulated by addition of a solution of polydextrose at a pH of 6.4 in a proportion of about 17% to 33% of the final composition.

7 Claims, No Drawings

PROCESS FOR PREPARING A MILK JAM WITHOUT ADDED SUGAR

FIELD OF THE INVENTION

This invention relates to a dietetic milk jam and a process for its preparation.

BACKGROUND OF THE INVENTION

The main ingredients of traditional milk jam are simple sugars, namely, in a decreasing order, sucrose, glucose, fructose, etc. Dietetic milk jams or similar products designed for specific dietary requirements are usually obtained by trying to reduce the sugar content of the product.

The novelty of the present invention resides in the total elimination of sucrose, glucose and fructose.

DESCRIPTION OF THE INVENTION

The product of the invention is a milk jam with no added sugar or with no sugar that has the same properties as the traditional product and is obtained through a process that utilizes liquid milks, powdered milk or a pre-condensed milk. In addition, the novel product of the invention contains no food additives, such as flavoring agents, in spite of which it tastes the same as traditional milk jam.

Milk jam owes its flavor and color to a series of reactions, such as the Maillard reaction, involving carbohydrates and milk proteins.

By eliminating simple sugars from the novel product, the resulting composition of the product of the invention is as follows:

| | |
|---|---|
| Lactoproteins (MG 1.5%) | in the range of 5% to 9% |
| Polydextrose | in the range of 17% to 33% |
| Lactitol | in the range of 9% to 17% |
| Maltodextrine | in the range of 5.5% to 10.5% |
| Sorbitol | in the range of 5.5% to 10.5% |
| Minerals | in the range of 1.4% to 2.6% |
| Fat | in the range of 2.5% to 4.5% |
| Sucrose | 0% |
| Fructose | 0% |
| Carragenate | 0.1% |
| Sodium bicarbonate | in the range of 0.7% to 1.3% |
| Sodium citrate | 0.2% |
| Potassium sorbate | 0.2% |
| Water csp | 100 |
| Acesulfame K | 0.1–0.5% |
| Glyceryl monstearate | 0.02–0.03% |

The manufacturing process differs from the traditional process and comprises the steps of:

1. Hydrolyzing the initial milk (20–40% hydrolysis with lactase).

2. Heating the milk with sodium bicarbonate as an acidity regulator and monostearate as antifoam agent.

3. Adding lactitol.

4. Dissolving polydextrose in hot water in a separate container and regulating the pH with sodium bicarbonate until pH=6.4 (Critical point of the process).

5. Adding sorbitol and maltodextrine.

6. Adding polydextrose, dissolved approximately 0.5–1 hour before the curdling.

7. Addition of carrageenan.

8. Curdling of the jam at 68–74° Brix.

I claim:

1. A process for preparing from milk a dietetic milk jam product that is free of sucrose, comprising the steps of:
   a. hydrolyzing 20% to 40% of the lactose in the milk with lactase;
   b. heating the product of step (a) with addition of sodium bicarbonate to regulate acidity and a monostearate anti-foam agent;
   c. adding lactitol to the product of step (b);
   d. preparing a separate hot aqueous solution of polydextrose and maintaining the polydextrose solution at a pH of 6.4 by addition of sodium bicarbonate;
   e. adding sorbitol and maltodextrine to the solution of step (d);
   f. adding the solution of step (e) to the product of step (c) and mixing the composition for about 30 to 60 minutes;
   g. adding carragenine to the composition of step (f); and
   h. curdling the milk jam to provide a product of 68° to 74° Brix.

2. The process of claim 1 which further comprises adding of sodium citrate and potassium sorbate to the composition.

3. The process of claim 1, wherein the monsterate is glyceryl monsterate.

4. The process of claim 1 which further comprises adding potassium acesulfame to the milk jam.

5. The process of claim 1, wherein the lactitol is from about 9% to 17% of the milk jam product.

6. The process of claim 1, wherein the polydextrose is from about 17% to 33% of the milk jam product.

7. The process of claim 1, wherein each of the maltodextrine and sorbitol are from about 5.5% to 10.5% of the milk jam product.

* * * * *